United States Patent
Glynn et al.

(10) Patent No.: US 9,247,229 B2
(45) Date of Patent: *Jan. 26, 2016

(54) TEMPORAL CADENCE PERTURBATION FOR TIME-DIVISION STEREOSCOPIC DISPLAYS

(75) Inventors: Dominic Glynn, Berkeley, CA (US); Rod Bogart, San Rafael, CA (US)

(73) Assignee: Pixar, Emeryville, CA (US)

( * ) Notice: Subject to any disclaimer, the term of this patent is extended or adjusted under 35 U.S.C. 154(b) by 716 days.

This patent is subject to a terminal disclaimer.

(21) Appl. No.: 13/215,191

(22) Filed: Aug. 22, 2011

(65) Prior Publication Data

US 2013/0050182 A1 Feb. 28, 2013

(51) Int. Cl.
*G06T 15/00* (2011.01)
*H04N 13/00* (2006.01)
*H04N 13/04* (2006.01)

(52) U.S. Cl.
CPC ....... *H04N 13/0022* (2013.01); *H04N 13/0029* (2013.01); *H04N 13/0066* (2013.01); *H04N 13/0438* (2013.01); *H04N 13/0459* (2013.01); *H04N 13/0497* (2013.01); *H04N 2013/0081* (2013.01); *H04N 2013/0085* (2013.01)

(58) Field of Classification Search
CPC ....... G06T 7/0071; G06T 15/10; G06T 19/00; G06T 2207/10016; G06T 2207/10021; G06T 17/00; G06T 17/20; H04N 13/0022; H04N 13/026; H04N 13/0029; H04N 13/0438; H04N 13/0459; H04N 2013/0081; H04N 2013/0085; H04N 13/0066; H04N 13/0497

See application file for complete search history.

(56) References Cited

U.S. PATENT DOCUMENTS

| | | | |
|---|---|---|---|
| 5,701,154 A * | 12/1997 | Dasso | 348/42 |
| 2002/0191841 A1* | 12/2002 | Harman | 382/154 |
| 2006/0114317 A1 | 6/2006 | Yuuki et al. | |
| 2007/0216701 A1 | 9/2007 | Bruderlin et al. | |
| 2011/0032330 A1 | 2/2011 | Kim et al. | |
| 2011/0058016 A1 | 3/2011 | Hulyalkar et al. | |
| 2011/0096069 A1* | 4/2011 | Redmann | 345/419 |
| 2011/0285831 A1* | 11/2011 | Ohba et al. | 348/56 |
| 2011/0304693 A1* | 12/2011 | Border et al. | 348/46 |
| 2011/0310235 A1 | 12/2011 | Sasaki et al. | |

OTHER PUBLICATIONS

US Office Action dated Feb. 12, 2014, U.S. Appl. No. 13/215,186.

* cited by examiner

*Primary Examiner* — Sing-Wai Wu
(74) *Attorney, Agent, or Firm* — Patterson + Sheridan LLP (57) ABSTRACT

One or more techniques to reduce or eliminate the false depth of objects that move along the axis of ocular separation when displayed using time division multiplexing. Experiments can be performed to determine a perceived depth of an object moving with known velocity. Then, when rendering stereoscopic image pairs, the location of the object can be modified to change the perceived stereoscopic depth of the object to compensate for the false depth. In one technique, the images can be displayed with alternating left- and right-precedence to reduce the perception of false depth.

22 Claims, 6 Drawing Sheets

TEMPORAL CADENCE PERTURBATION FOR TIME-DIVISION STEREOSCOPIC DISPLAYS

BACKGROUND

1. Field of the Invention

The present invention relates to the field of computer graphics and, in particular, to a system and method for temporal cadence perturbation for time-division stereoscopic displays.

2. Description of the Related Art

The illusion of depth in stereoscopic displays is created when at least two images are fused perceptually by a viewer in space and time during the act of viewing. The mechanics of display technologies and the need to isolate multiple image streams on a single display device often incurs time separation of the image streams (e.g., a single projector digital cinema or most 3D (three-dimensional) televisions). Accordingly, in the case of stereoscopic time division, the left image precedes the right image (or vice versa) by some sub-frame period.

Efforts to reduce the temporal separation of the image streams include "double flashing" or "triple flashing" the images such that for each image set (frame pair) the individual images are shown twice or three (or conceivably more) in an interleaved fashion (e.g., LRLRLR in ¹⁄₂₄ seconds for triple flash digital cinema). In order to project in 3D so that viewers do not suffer from any discomfort, the projector "flashes" each frame for each eye three times as fast as with conventional projection. This tripling of the frame rate (e.g., from 48 fps (frames per second) to 144 fps) smoothes the projection and provides for better motion rendition.

However, even with this "triple flash" technique, one image stream (e.g., the left eye image stream) precedes the other image stream by a fixed period. For example, in the LRLRLR example, the left image precedes the right image by ¹⁄₁₄₄ seconds every ¹⁄₂₄ seconds, or more precisely, the three exposures of each left image as a set, precede the three exposures of the set of right images by ¹⁄₁₄₄ seconds. Displaying one image or image set before the other image or image set of the pair causes unwanted "false depth" cues depending on the temporal separation of the image streams and the axis of motion of objects in the scene. False depth is the phenomenon that an object that is moving along the axis of ocular separation (e.g., left-to-right or right-to-left) appears to have an added depth component into or out of the screen, depending on which (left or right) image is shown first and possibly the polarity of the projector. The false depth is undesirable and can be jarring or uncomfortable to the viewer.

As the foregoing illustrates, there is a need in the art for an improved technique that addresses the limitations of current approaches set forth above.

SUMMARY

Embodiments of the invention provide one or more techniques to reduce or eliminate the false depth of objects that move along the axis of ocular separation when displayed using time division multiplexing. Experiments can be performed to determine a perceived depth of an object moving with known velocity. Then, when rendering stereoscopic image pairs, the location of the object can be modified to change the perceived stereoscopic depth of the object to compensate for the false depth. In one technique, the images can be displayed with alternating left- and right-precedence to reduce the perception of false depth.

One embodiment of the invention provides a computer-implemented method for modifying a perceived depth of an object. The method includes receiving a sequence of stereoscopic image pairs to be displayed using time division multiplexing; determining a screen space velocity of an object moving in the sequence of images; determining a relative depth offset of the object between a left image and a right image of a stereoscopic image pair; and determining a modified depth of the object based on the screen space velocity and the relative depth offset.

Another embodiment of the invention provides a computer-implemented method for modifying a perceived depth of an object. The method includes determining a screen space velocity of an object moving in a sequence of images; obtaining a depth offset associated with the velocity of the object from a table of depth offsets and corresponding velocities, where the depth offset is a difference between an intended depth of the object and a perceived depth of the object; and modifying a location of the object based on the depth offset so that a modified perceived depth of the object is equivalent to the intended depth of the object.

Yet another embodiment of the invention provides a computer-implemented method for modifying a perceived depth of an object. The method includes displaying a first frame associated with a stereoscopic image pair that includes a first left image and a first right image with left precedence, wherein the first left image is displayed before the first right image; and displaying a second frame associated with a stereoscopic image pair that includes a second left image and a second right image with right precedence, wherein the second right image is displayed before the second left image.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Embodiments of the invention provide one or more techniques to reduce or eliminate the false depth of objects that move along the axis of ocular separation when displayed using time division multiplexing. Experiments can be performed to determine a perceived depth of an object moving with known velocity. Then, when rendering stereoscopic image pairs, the location of the object can be modified to change the perceived stereoscopic depth of the object to compensate for the false depth. In one technique, the images can be displayed with alternating left- and right-precedence to reduce the perception of false depth.

One embodiment of the invention provides a computer-implemented method for modifying a perceived depth of an object. The method includes receiving a sequence of stereoscopic image pairs to be displayed using time division multiplexing; determining a screen space velocity of an object moving in the sequence of images; determining a relative depth offset of the object between a left image and a right image of a stereoscopic image pair; and determining a modified depth of the object based on the screen space velocity and the relative depth offset.

Another embodiment of the invention provides a computer-implemented method for modifying a perceived depth of an object. The method includes determining a screen space velocity of an object moving in a sequence of images; obtaining a depth offset associated with the velocity of the object from a table of depth offsets and corresponding velocities, where the depth offset is a difference between an intended depth of the object and a perceived depth of the object; and modifying a location of the object based on the depth offset so that a modified perceived depth of the object is equivalent to the intended depth of the object.

Yet another embodiment of the invention provides a computer-implemented method for modifying a perceived depth of an object. The method includes displaying a first frame associated with a stereoscopic image pair that includes a first left image and a first right image with left precedence, wherein the first left image is displayed before the first right image; and displaying a second frame associated with a stereoscopic image pair that includes a second left image and a second right image with right precedence, wherein the second right image is displayed before the second left image.

Hardware Overview

Figure 1:
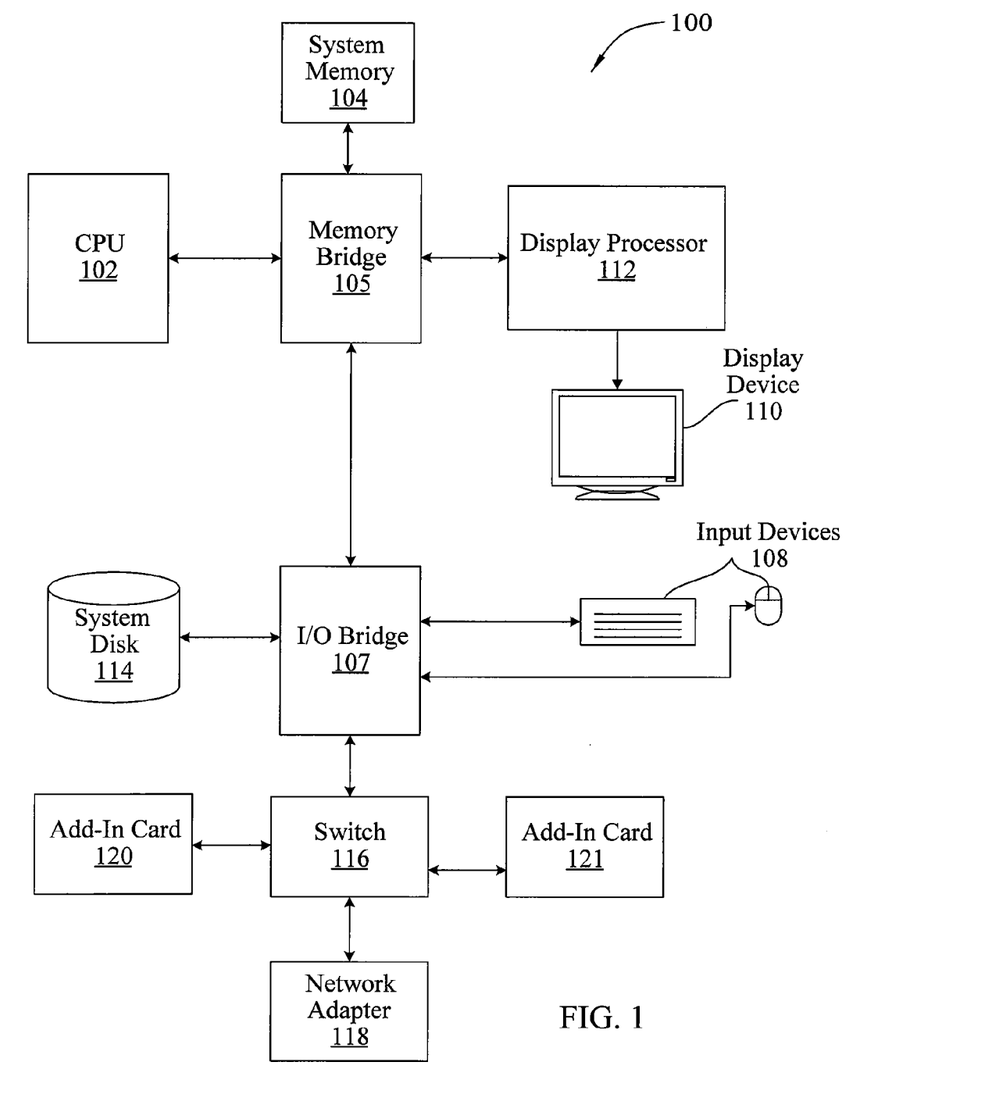
FIG. 1 is a block diagram of a system configured to implement one or more aspects of the invention.

FIG. 1 depicts one architecture of a system 100 within which embodiments of the present invention may be implemented. This figure in no way limits or is intended to limit the scope of the present invention. System 100 may be a personal computer, video game console, personal digital assistant, rendering engine, or any other device suitable for practicing one or more embodiments of the present invention.

As shown, system 100 includes a central processing unit (CPU) 102 and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

A display processor 112 is coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

CPU 102, render farm, and/or display processor 112 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Temporal Cadence Perturbation

Figure 2:
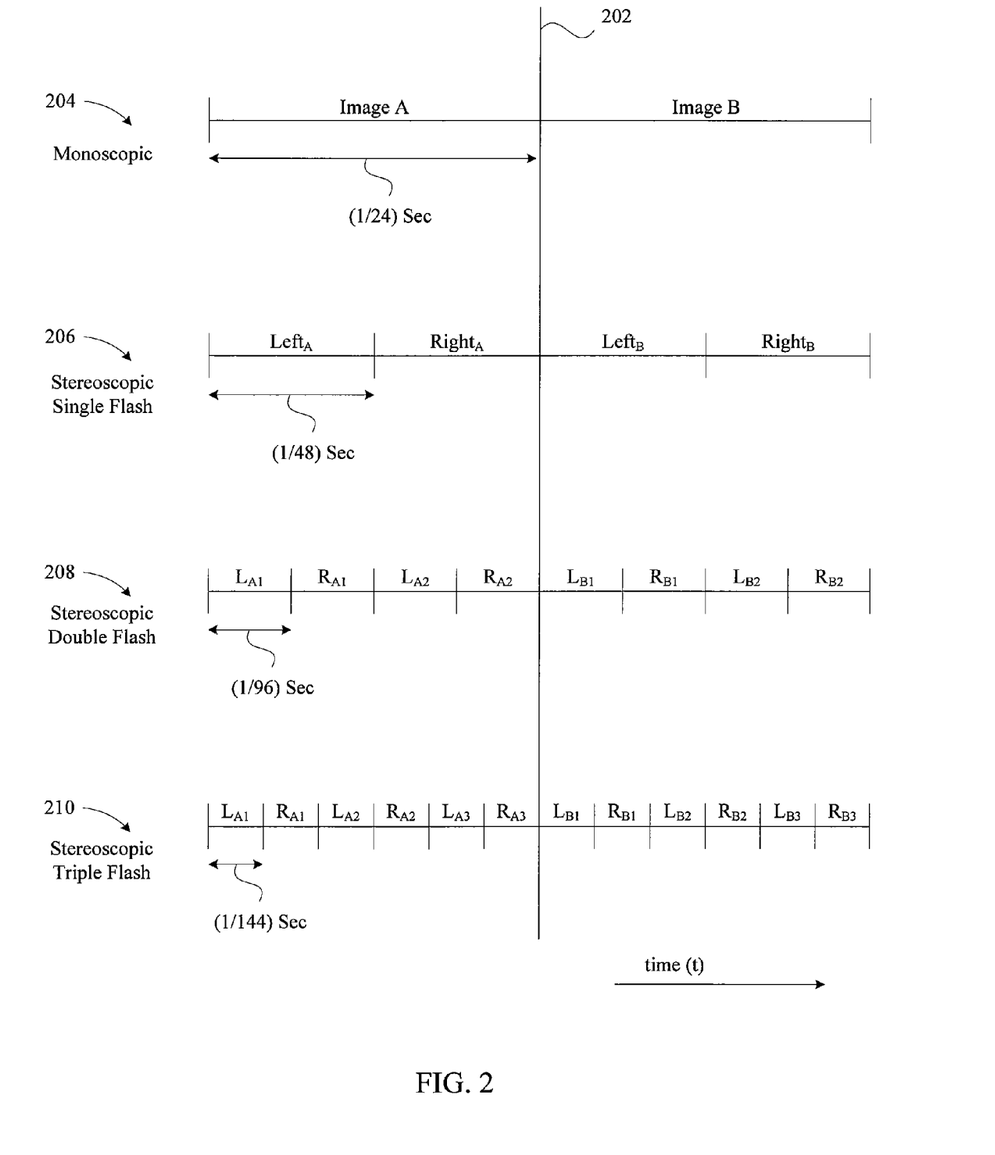
FIG. 2 is a timing diagram illustrating displaying image frames using various stereoscopic techniques, according to some embodiments of the invention.

FIG. 2 is a timing diagram illustrating displaying image frames using various stereoscopic techniques, according to some embodiments of the invention. As shown, time t increases from left to right. In monoscopic image display 204, image A is displayed for a period of time (e.g., 1/24 seconds) and then image B is displayed for a period of time. A frame division 202 occurs between image A and image B.

In "single flash" stereoscopic image display 206, a left eye image A and a right eye image A are each displayed for 1/48 seconds within the time to display the first frame. Then, a left eye image B and a right eye image B are each displayed for 1/48 seconds within the time to display the second frame. In "double flash" stereoscopic image display 208, the left and right images are each displayed twice within the time allocated for a single frame. In "triple flash" stereoscopic image display 210, the left and right images are each displayed three times within the time allocated for a single frame.

Figure 3:
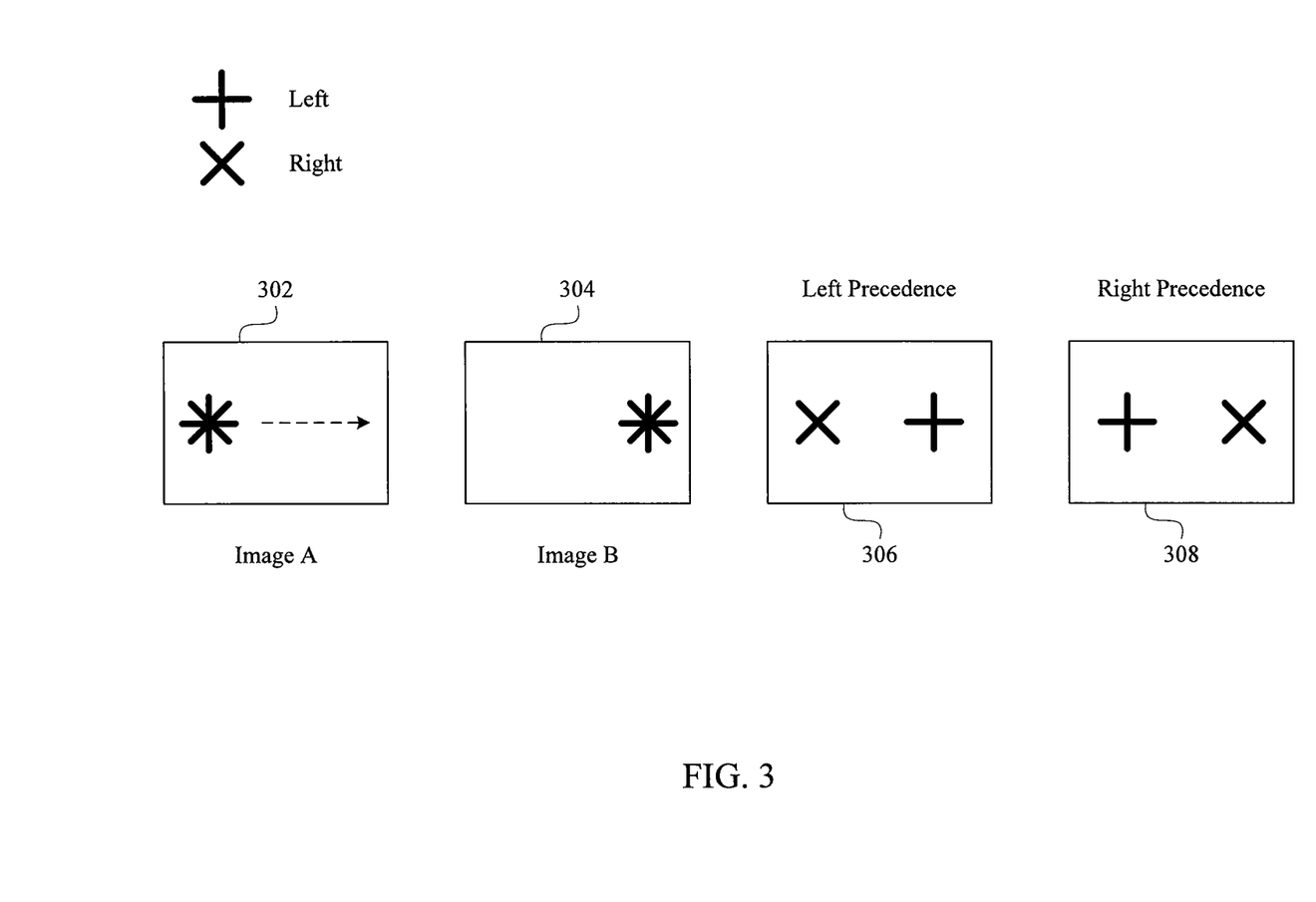
FIG. 3 is conceptual diagram illustrating a false depth associated with stereoscopic images, according to one embodiment of the invention

However, as described above, even with the "triple flash" technique, one image stream precedes the other image stream by a fixed period, causing unwanted false depth. FIG. 3 is a conceptual diagram illustrating false depth associated with stereoscopic images, according to one embodiment of the invention. Consider the case of an object having a horizontal motion component from left to right. For example, the object may be moving at a constant velocity at the "screen plane," which corresponds to the depth of the screen. In one embodiment, the horizontal motion component is relative to a perspective of the viewer.

As shown in image A 302, the object as perceived by the left eye (represented by a "+") and the object as perceived by the right eye (represented by an "X") occupy the same screen-space location. Similarly, in image B 304, the object as perceived by the left eye and the object as perceived by the right eye occupy the same screen-space location, where the location in image B 304 is further to the right relative to the location in image A 302.

However, in time division multiplexing, either the left image or the right image set temporally precedes the other. During the period at which the left image set precedes the right image set (i.e., "left precedence" as shown in frame 306), there is a disparity in the perceived screen-space location of the object between the two temporally adjacent images. Similarly, if the right image set were to be displayed first, then during the period at which the right image set precedes the left (i.e., "right precedence" as shown in frame 308), there is also a disparity in the perceived screen-space location of the object between the two temporally adjacent images, but in the opposite direction relative to the screen plane. Embodiments of the invention provide one or more techniques to reduce and/or eliminate the perception of false depth in stereoscopic images.

Figure 4:
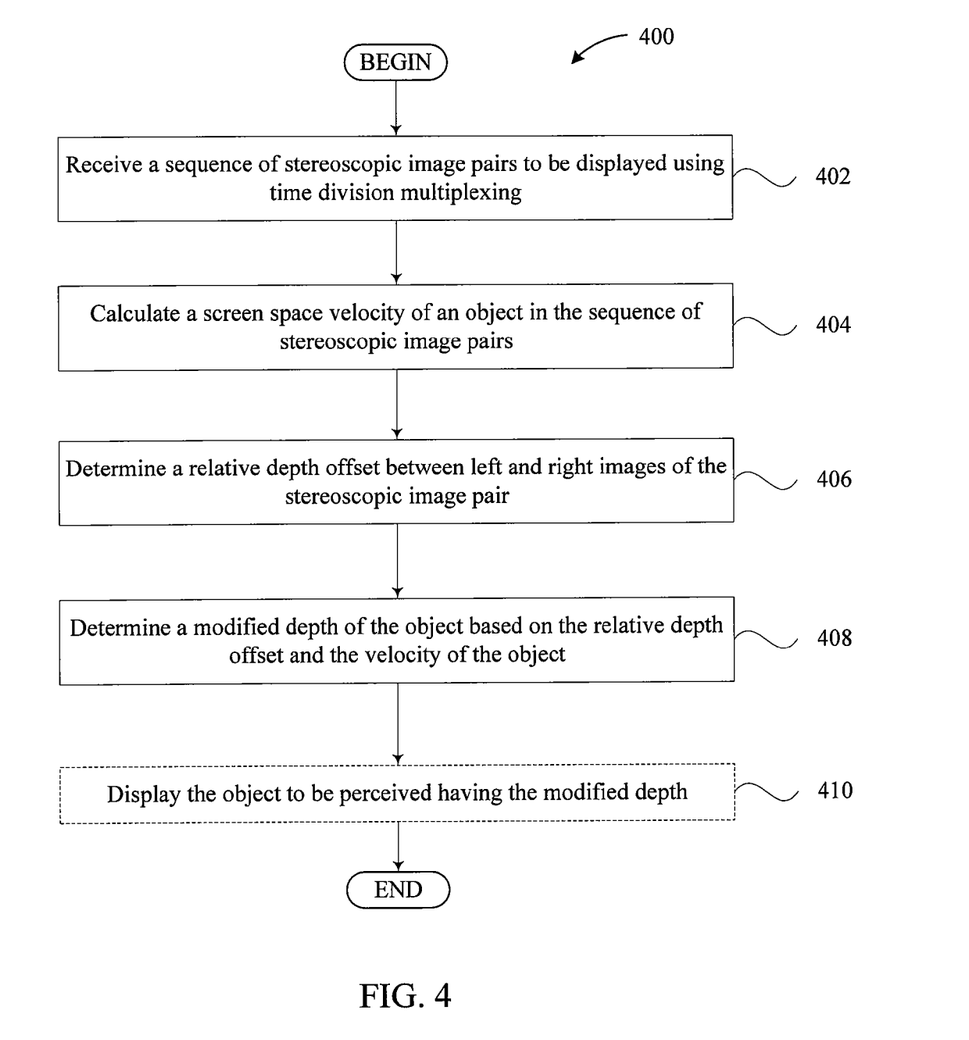
FIG. 4 is a flow diagram of method steps for modifying the perceived depth of an object, according to one embodiment of the invention.

FIG. 4 is a flow diagram of method steps for modifying the perceived depth of an object, according to one embodiment of the invention. Persons skilled in the art will understand that, even though the method 400 is described in conjunction with the systems of FIGS. 1-3, any system configured to perform the method steps, in any order, is within the scope of embodiments of the invention.

As shown, the method 400 begins at step 402, where a software application, such as a rendering application executed by a processor, receives a sequence of stereoscopic image pairs to be displayed using time division multiplexing. As described above, the sequence image stereoscopic image pairs can be displayed using single flash, double flash, triple flash, or any multiple number of flashes. The sequence of images may include an object that is moving along the axis of ocular separation (i.e., left-to-right or right-to-left). The sequence of stereoscopic image pairs may be authored so that the object is to appear at a certain depth relative to the screen plane. In one example, suppose the object is authored to appear to be coincident with the screen plane.

At step 404, the software application calculates a screen space velocity of the object in the sequence of stereoscopic image pairs. In one embodiment, the same entity (such as, for example, a motion picture studio) is responsible for both authoring and rendering the image sequence of stereoscopic image pairs. Accordingly, in one embodiment, the velocity of the object may be included in metadata associated with the sequence of stereoscopic image pairs authored by the common entity. In other embodiments, such as when one entity authors and another entity renders the images, the velocity of the object can be calculated using any known technique, such as determining how many pixels the object moves in a certain period of time.

At step 406, the software application determines a relative depth offset between left and right images of the stereoscopic image pair. As described above, when displaying images using time division multiplexing, a false depth may be perceived. Embodiments of the invention compensate for the perceived depth offset, thereby reducing or eliminating the false depth. In one embodiment, determining the relative depth offset is based on performing an experiment with one or more viewers to determine the perceived offset of an object having a known velocity. This experimental technique is described below in FIG. 5. According to various embodiments, the relative depth offset that is perceived may be based on the particular display technology being used to display the stereoscopic image pair, a configuration (e.g., polarity) of the display device that displays the first stereoscopic image pair, an amount of time between displaying the left image and the right image (i.e., an amount of "blank" time between left and right images being displayed as the display device configures itself to display the other image of the pair), a number of times that the left image and right image are repeated (e.g., single-, double-, triple-flashing), among other factors.

At step 408, the software application determines a modified depth of the object based on the relative depth offset and the velocity of the object. In one embodiment, determining the modified depth comprises performing a look-up in a table of modified depth values corresponding to the velocity of the object. In some embodiments, the depth of the object in only one of the images in the pair (e.g., only the left eye image) is modified, so that the combination of the original right eye image and the modified left eye image achieves the desired result. In some embodiments, one or more of the images in the stereoscopic pair can be modified to apply the modified depth to the object.

At step 410, the software application displays the object, where the object is perceived to have the modified depth. In other embodiments, step 410 is optional and is omitted, as indicated by the dotted line around step 410. For example, the images with the modified depth values may be stored in a computer readable medium (e.g., a memory or a disc) for future display. For example, a location of the object is modified based on the depth offset so that a modified perceived depth of the object is equivalent to the intended depth of the object. In one embodiment, modifying the location of the object comprises modifying a screen space location of the object. For example, modifying the screen space location of the object comprises modifying a horizontal component of the object. In another embodiment, modifying the location of the object comprises modifying a world space location of the object and generating a modified stereoscopic image pair based on the modified world space location of the object.

According to some embodiments, the method 400 can be repeated for each object that is moving along the axis of ocular separation.

Figure 5:
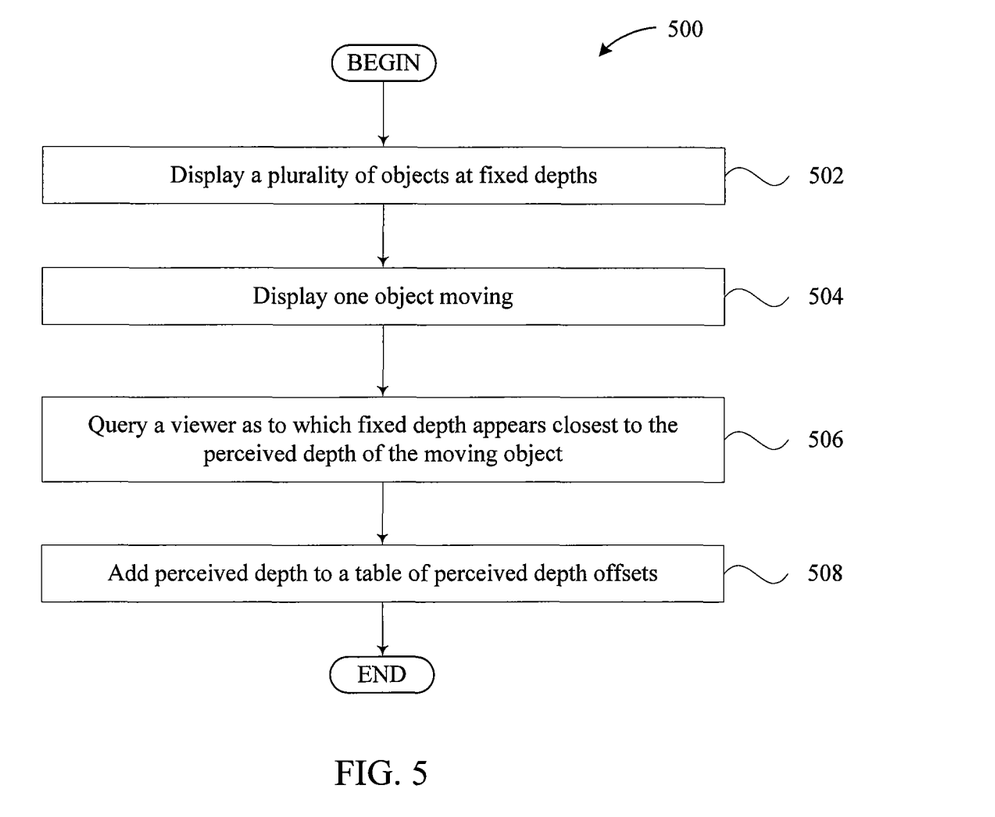
FIG. 5 is a flow diagram of method steps for generating a table of perceived depth offsets and corresponding velocities, according to one embodiment of the invention.

FIG. 5 is a flow diagram of method steps for generating a table of perceived depth offsets and corresponding velocities, according to one embodiment of the invention. Persons skilled in the art will understand that, even though the method 500 is described in conjunction with the systems of FIGS. 1-3, any system configured to perform the method steps, in any order, is within the scope of embodiments of the invention.

At step 502, the software application displays a plurality of objects at fixed depths. For example, ten different objects may be displayed, where five of the objects are displayed having a stereoscopic depth that is in front of the screen plane and five of the objects are displayed having a stereoscopic depth that is in behind the screen plane. The stereoscopic depth of each of the ten objects is fixed, i.e., known by the software application.

At step 504, the software application displays another object moving along the axis of ocular separation. At step 506, the software application queries a viewer as to which of the ten fixed depth objects appears closest in depth to the perceived depth of the moving object. As described above, the perceived depth may be based on a variety of factors. In some embodiments, a plurality of different viewers may be queried. Each one of the plurality of viewers may perceive a different perceived depth. The perceived depths of the plurality of viewers can be averaged together to achieve a normalized perceived depth for the object corresponding to the velocity.

At step 508, the software application adds the perceived depth to a table of perceived depth offsets. Each entry in the table can be associated with a different velocity of a moving object. The table can be populated using the described experimental technique to obtain perceived depth values of objects moving at various velocities. Thus, when rendering images, the rendering application can perform table look-ups in the table to determine how to properly compensate for the perceived depth of the moving objects based on the velocity of a particular object.

In addition, in yet another embodiment, the perceived depth of the moving object can be compensated for by "dithering" the left and right images in the stereoscopic pair. For example, a first frame may be displayed with left precedence: LRLRLR. Then, the next frame may be displayed with right precedence: RLRLRL. By alternating left- and right-precedence, the false depth of the object can be reduced or eliminated.

Figure 6A:
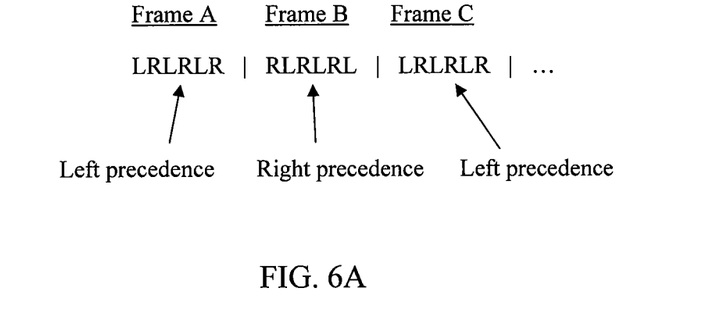
FIG. 6A is a conceptual diagram illustrating alternating displaying frames with left precedence and right precedence, according to one embodiment of the invention.

FIG. 6A is a conceptual diagram illustrating alternating displaying frames with left precedence and right precedence, according to one embodiment of the invention. As shown, Frame A is displayed with triple-flash technology and is displayed with left precedence, i.e., the left image is displayed before the right image in an alternating pattern. Then, Frame B is displayed with right precedence, i.e., the right image in Frame B is displayed before the left image in Frame B. Frame C is then displayed with left precedence. The frames can continue to be displayed by alternating between left and right precedence. Accordingly, in some embodiments, at the border between frames (e.g., the border between Frame A and Frame B), there would be an equal number of "right image" to "left image" transitions as there are "left image" to "right image" transitions over the entirety of the sequence of frames.

Figure 6B:
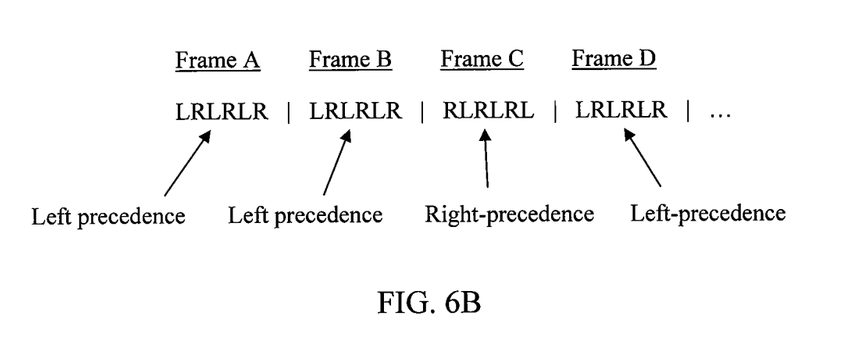
FIG. 6B is a conceptual diagram illustrating randomly alternating displaying frames with left precedence and right precedence, according to one embodiment of the invention.

FIG. 6B is a conceptual diagram illustrating randomly alternating displaying frames with left precedence and right precedence, according to one embodiment of the invention. In this embodiment, rather than simply alternating between left- and right-precedence, the decision of which precedence should be used for a given frame is made random. In the example shown in FIG. 6B, Frames A, B, and D are displayed with left precedence, while Frame C is displayed with right precedence. Accordingly, in some embodiments, over the course of a series of frames, the number of "right image" to "left image" transitions at frame borders should approximate the number of "left image" to "right image" transitions, which would substantially reduce or eliminate the false depth of moving objects.

Figure 6C:
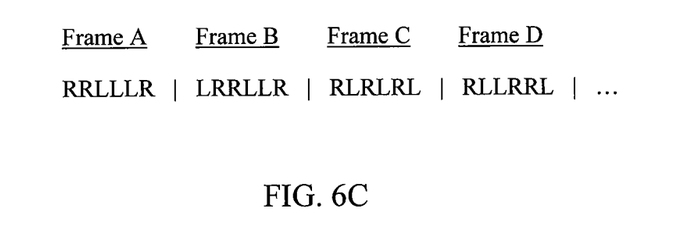
FIG. 6C is a conceptual diagram illustrating randomizing the order of left and right images in a stereoscopic image pair, according to one embodiment of the invention.

FIG. 6C is a conceptual diagram illustrating randomizing the order of left and right images in a stereoscopic image pair, according to one embodiment of the invention. In this embodiment, rather than having a fixed left- or right-precedence within a frame, the sub-frame images can be randomized. In the example shown, each frame is displayed with triple-flash technology, meaning that the left image and the right image of a stereoscopic pair are each displayed three times. However, as also shown, the order of these six images within a frame can be randomized, with the constraint that each image is displayed exactly three times. In this particular example, Frame A is displayed as RRLLLR, Frame B is displayed as LRRLLR, Frame C is displayed as RLRLRL, and Frame D is displayed as RLLRRL. Accordingly, in some embodiments, over the course of a series of frames, the number of "right image" to "left image" transitions at frame borders should approximate the number of "left image" to "right image" transitions, which would substantially reduce or eliminate the false depth of moving objects.

In sum, embodiments of the invention provide one or more techniques to reduce or eliminate the false depth of objects that move along the axis of ocular separation when displayed using time division multiplexing. Experiments can be performed to determine a perceived depth of an object moving with known velocity. Then, when rendering stereoscopic image pairs, the location of the object can be modified to change the perceived stereoscopic depth of the object to compensate for the false depth. In one technique, the images can be displayed with alternating left- and right-precedence to reduce the perception of false depth.

One advantage of embodiments of the invention is that moving objects are perceived to have the "correct" stereoscopic depth that corresponds to the stereoscopic depth at which the objects were originally authored.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method to compensate for false depth of a target object resulting from stereoscopic time division multiplexing when the target object moves along an axis of ocular separation, the computer-implemented method comprising:
receiving input specifying which object in a plurality of displayed objects, each having a fixed depth value, appears at a depth that is most similar to a perceived depth of an initial, moving object distinct from the target object and the object specified by the received input;
receiving a sequence of stereoscopic image pairs to be displayed using stereoscopic time division multiplexing;
determining a screen space velocity of the target object moving along the axis of ocular separation in the sequence of images, wherein the screen space velocity of the target object corresponds to that of the initial, moving object;
determining a relative depth offset of the target object between a left image and a right image of a stereoscopic image pair, based on the fixed depth value of the object specified by the received input; and
determining a modified depth of the target object based on the screen space velocity and the relative depth offset, wherein the modified depth alters a perceived depth of the target object to an intended depth of the target object, thereby compensating for the false depth of the target object resulting from stereoscopic time division multiplexing when the target object moves along the axis of ocular separation.

2. The computer-implemented method of claim 1, wherein screen space velocity is based on a horizontal motion component of the target object.

3. The computer-implemented method of claim 2, wherein the horizontal motion component is relative to a perspective of a viewer.

4. The computer-implemented method of claim 1, further comprising modifying one or more of the images in the stereoscopic pair to apply the modified depth to the target object.

5. The computer-implemented method of claim 4, further comprising causing the target object to be displayed having the modified depth.

6. The computer-implemented method of claim 1, wherein the modified depth of the target object is further based on a configuration of a display device that displays the stereoscopic image pair.

7. The computer-implemented method of claim 6, wherein the display device comprises a projector, and the configuration of the display device includes a setting for a polarity of the projector, wherein the polarity of the projector determines whether the projector is configured to project images with left precedence or right precedence.

8. The computer-implemented method of claim 1, wherein the modified depth of the target object is further based on an amount of time between displaying the left image and the right image.

9. The computer-implemented method of claim 1, wherein the modified depth of the target object is further based on a number of times that the left image and right image are repeated for the stereoscopic image pair.

10. The computer-implemented method of claim 1, further comprising:
displaying the plurality of objects; and
displaying the initial, moving object.

11. The computer-implemented method of claim 10, further comprising storing the input in a table comprising depth offsets and corresponding velocities, wherein each depth offset is a difference between an intended depth of the target object and a false depth of the target object.

12. A non-transitory computer-readable medium storing instructions that, when executed by a processor, cause a computer system to compensate for a false depth of a target object resulting from stereoscopic time division multiplexing when the target object moves along an axis of ocular separation, by performing the steps of:
receiving input specifying which object in a plurality of displayed objects, each having a fixed depth value, appears at a depth that is most similar to a perceived depth of an initial, moving object distinct from the target object and the object specified by the received input;

receiving a sequence of stereoscopic image pairs to be displayed using stereoscopic time division multiplexing;

determining a screen space velocity of the target object moving along the axis of ocular separation in the sequence of images, wherein the screen space velocity of the target object corresponds to that of the initial, moving object;

determining a relative depth offset of the target object between a left image and a right image of a stereoscopic image pair, based on the fixed depth value of the object specified by the received input; and determining a modified depth of the target object based on the screen space velocity and the relative depth offset, wherein the modified depth alters a perceived depth of the target object to an intended depth of the target object, thereby compensating for the false depth of the target object resulting from stereoscopic time division multiplexing when the target object moves along the axis of ocular separation.

13. The non-transitory computer-readable medium of claim 12, wherein screen space velocity is based on a horizontal motion component of the target object.

14. The non-transitory computer-readable medium of claim 13, wherein the horizontal motion component is relative to a perspective of a viewer.

15. The non-transitory computer-readable medium of claim 12, wherein the steps further include modifying one or more of the images in the stereoscopic pair to apply the modified depth to the target object.

16. The non-transitory computer-readable medium of claim 15, wherein the steps further include causing the target object to be displayed having the modified depth.

17. The non-transitory computer-readable medium of claim 12, wherein the modified depth of the target object is further based on a configuration of a display device that displays the stereoscopic image pair.

18. The non-transitory computer-readable medium of claim 17, wherein the display device comprises a projector, and the configuration of the display device includes a setting for a polarity of the projector, wherein the polarity of the projector determines whether the projector is configured to project images with left precedence or right precedence.

19. The non-transitory computer-readable medium of claim 12, wherein the modified depth of the target object is further based on an amount of time between displaying the left image and the right image.

20. The non-transitory computer-readable medium of claim 12, wherein the modified depth of the target object is further based on a number of times that the left image and right image are repeated for the stereoscopic image pair.

21. The non-transitory computer-readable medium of claim 12, wherein the steps further include:
    displaying the plurality of objects; and displaying the initial, moving object.

22. The non-transitory computer-readable medium of claim 21, wherein the steps further include storing the input in a table comprising depth offsets and corresponding velocities, wherein each depth offset is a difference between an intended depth of the target object and a false depth of the target object.

* * * * *